US008004419B2

(12) United States Patent
Thornley et al.

(10) Patent No.: US 8,004,419 B2
(45) **Date of Patent: *Aug. 23, 2011**

(54) INTRUSION DETECTION USING A CONDUCTIVE MATERIAL

(75) Inventors: Randal Quincy Thornley, Nampa, ID (US); David Alan Roberts, Meridian, ID (US); William James Tiffany, Eagle, ID (US)

(73) Assignee: Maxim Integrated Products, Inc., Sunnyvale, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 12/661,834

(22) Filed: Mar. 24, 2010

(65) Prior Publication Data

US 2010/0182020 A1 Jul. 22, 2010

Related U.S. Application Data

(63) Continuation of application No. 11/731,423, filed on Mar. 30, 2007, now Pat. No. 7,710,286.

(51) Int. Cl.
*G08B 21/00* (2006.01)

(52) U.S. Cl. ........................................................ 340/657

(58) Field of Classification Search .................. 340/657, 340/568.1, 660, 664, 665; 257/425
See application file for complete search history.

(56) References Cited

U.S. PATENT DOCUMENTS

| | | | | |
|---|---|---|---|---|
| 5,060,261 | A | 10/1991 | Avenier et al. | 713/194 |
| 5,239,664 | A | 8/1993 | Verrier et al. | 726/27 |
| 5,353,350 | A | 10/1994 | Unsworth et al. | 713/194 |
| 6,895,509 | B1 * | 5/2005 | Clark | 726/23 |
| 7,343,496 | B1 | 3/2008 | Hsiang et al. | 713/194 |
| 7,489,013 | B1 | 2/2009 | Chubin et al. | 257/417 |
| 2004/0217472 | A1 * | 11/2004 | Aisenbrey et al. | 257/734 |
| 2006/0015947 | A1 | 1/2006 | Conti et al. | 726/34 |
| 2007/0018334 | A1 | 1/2007 | Peytavy et al. | 257/778 |

* cited by examiner

*Primary Examiner* — Phung Nguyen
(74) *Attorney, Agent, or Firm* — North Weber & Baugh LLP

(57) ABSTRACT

Tampering with an assembly that includes an integrated circuit is detected by measuring a change in at least one property of a conductive molding formed over at least a portion of the integrated circuit. For example, the conductive molding can be a mixture of resin with conductive powder and/or fibers. The molding can be formed as a continuous region or as strips of conductive material. Conductive contacts are positioned to provide and receive current through portions of the conductive material. For example, the property of the molding can be an impedance of a portion of the conductive molding. A significant change in the impedance measured through one or more conductive contacts indicates tampering with the assembly.

20 Claims, 5 Drawing Sheets

INTRUSION DETECTION USING A CONDUCTIVE MATERIAL

CROSS REFERENCE TO RELATED APPLICATION

This application is a continuation of, and claims priority under 35 U.S.C. §120 from, nonprovisional U.S. patent application Ser. No. 11/731,423 entitled "Intrusion Detection Using A Conductive Material," filed on Mar. 30, 2007, now U.S. Pat. No. 7,710,286 , the subject matter of which is incorporated herein by reference.

TECHNICAL FIELD

The present invention relates to techniques for detecting access to an integrated circuit device.

BACKGROUND

Point of sale (POS) terminals allow customers to make payments using a variety of payment instruments, such as credit cards, debit cards, smart cards and ATM cards. To ensure that the payment information transmitted from the POS terminals to a payment center is not accessed by unauthorized recipients, this information is typically encrypted and secured (e.g., using digital authentication) during transmission. However, confidential payment information entered by the user into the POS terminal could still be intercepted by tampering with the integrated circuits of the POS terminal. Thieves can use such information fraudulently to receive payment. It may also be desirable to maintain confidentiality of integrated circuit device layouts to prevent thieves from copying integrated circuit designs. Clearly the need to prevent unauthorized access to integrated circuits is present.

U.S. Pat. No. 4,811,288 describes a technique to prevent unauthorized access to a memory device through the use of a conductive mesh outside of the memory device. To access the memory device, a thief must cut through the conductive mesh. Cutting through the mesh, however, alters the conductive properties of the mesh. Altering portions of the conductive mesh can change impedances, create short circuits, and/or create open circuits. Detection of a change in an impedance, short circuits and/or open circuits is associated with tampering and in turn causes the memory to become erased. Thereby, unauthorized access to memory is prevented. However, use of such a mesh wire bond cage is expensive. Purchasers of integrated circuits are often very cost sensitive.

SUMMARY

In one embodiment, an apparatus includes an integrated circuit device and a conductive region formed over the integrated circuit device. An indication of access to the integrated circuit device can be based in part on measurement of a change of at least one property of the conductive region. In one implementation, the measured property is an impedance of a portion within the region. In one implementation, the conductive region includes conductive powder and/or conductive fibers interspersed within resin.

In another embodiment, a method indicates access to an integrated circuit device based in part on a change to a property of a region molded over the integrated circuit device. In one implementation, indicating access includes measuring an impedance through a portion of the region, comparing the measured impedance with a reference impedance value for the portion, and indicating an access based on a substantial difference between the measured impedance and the reference impedance value for the portion. In one implementation, the region includes conductive material interspersed among resin.

Other embodiments and advantages are described in the detailed description below. This summary does not purport to define the inventions. The inventions are defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
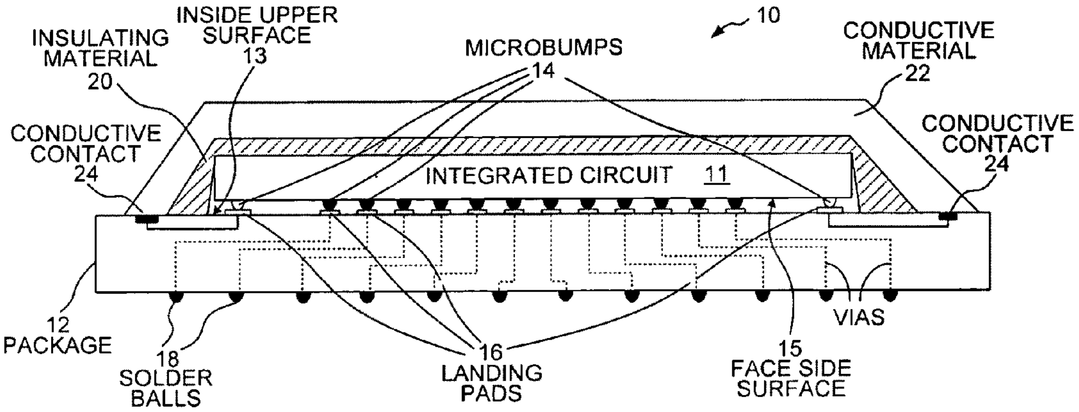
FIG. 1 is a simplified cross-sectional diagram of an assembly, in accordance with an embodiment of the present invention.

FIG. 1 is a simplified cross-sectional diagram of an assembly 10 including an integrated circuit 11 mounted in a ball grid array (BGA) package (also known as "substrate") 12, in accordance with an embodiment of the present invention. In one example, integrated circuit 11 is a programmable logic device (PLD) die that is mounted face-side down on an inside upper surface 13 of package 12 in a flip-chip manner. The term "face side" used here denotes the side of the die that receives the bulk of semiconductor processing such that circuitry is fabricated on that face side of the die. Microbumps 14 are present in an array on a bottom face-side surface 15 of integrated circuit 11. In one example, each microbump 14 is approximately 100 microns in diameter and is made of solder. Each microbump in the array of microbumps 14 contacts a corresponding landing pad in an array of landing pads 16 on inside upper surface 13 of package 12. The circuitry of integrated circuit 11 is coupled through package 12 to a printed circuit board (not shown) via solder balls 18 on the bottom surface of package 12. Vias are provided in package 12 to conductively couple the landings for the microbumps with solder balls 18.

An insulating material 20 is formed over integrated circuit 11. In one example, the insulating material is plastic or rubber. Conductive material 22 is formed over insulating material 20. Conductive material 22 is formed as a continuous region over insulating region 20. An indication that tampering with integrated circuit 11 has occurred is based in part on measuring a change of at least one property of conductive material 22. In one example, conductive material 22 is a resin-based material including conductive materials such as conductive powder, conductive fibers and/or carbon nanotubes. For example, the conductive resin-based material is a mixture as described in U.S. Patent Application Publication No. 2004/0217472, filed Apr. 14, 2004, by inventors Aisenbrey and Larsen. For example, conductive material 22 is a conductive ElectriPlast™ thermoplastic from Integral Technologies. In one example, the resin is any of polymer resins produced by GE PLASTICS, Pittsfield, Mass., other plastic material produced by GE PLASTICS, silicones produced by GE SILICONES, Waterford, N.Y., or other flexible resin-based rubber compounds produced by other manufacturers.

The mixture of base resins with conductive materials makes the overall conductive material 22 conductive rather than insulative. The resin provides structural integrity. The conductive fibers, conductive powders, carbon nanotubes, or a combination thereof, are homogenized within the resin during the molding process, providing the electrical continuity.

In one example, the conductive powders are formed from non-metals, such as carbon or graphite and may also be metal plated. In another example, the conductive powders are metals such as stainless steel, nickel, copper, or silver, and may also be metal plated. In one example, the conductor fibers are nickel plated carbon fiber, stainless steel fiber, copper fiber and/or silver fiber.

The following provides examples of how insulating material 20 and conductive material 22 are formed in assembly 10. Insulating material 20 is formed by injecting insulating material into a mold to establish the shape of insulating material 20 over integrated circuit 11. Conductive material 22 is formed by injecting a mixture of resin and conductive materials into a mold to establish the shape of conductive material 22. In one example, the conductive materials are homogenized (i.e., made an approximately uniform consistency) within a base resin when molded over insulating material 20. In an example, conductive material 22 is cut, stamped, extruded, laminated, and/or milled to provide the desired shape and size. Conductive material 22 is applied using a syringe.

In one example, conductive material 22 also serves as a heat sink to absorb heat generated by integrated circuit 11 to reduce the likelihood of overheating by integrated circuit 11. In one example, conductive material 22 may inhibit x-ray probing of integrated circuit 11 and thereby inhibit attempts to determine the integrated circuit device layout.

Conductive contacts 24 are formed on inside upper surface 13 of package 12 under the outer edges of conductive material 22. A conductive contact 24 is provided to input a current to conductive material 22. An output conductive contact 24 is provided to receive a current from conductive material 22. Multiple complementary conductive contacts are provided to transfer current through the conductive material. A single conductive contact 24 can provide current (or other signal) that is measured by one or more other conductive contact(s) 24.

During manufacture of assembly 10, impedances through portions of the conductive material 22 are measured. Direct or alternating current can be applied through conductive material 10 using a conductive contact 24 and received through one or more other conductive contacts 24. The impedance measured is a reference impedance value for the portion of conductive material 22 through which such current flows. For example, a resistance, an inductance and/or a capacitance are measured. The impedance values measured using currents received by each conductive contact 24 can be stored as reference impedance values in a memory device accessible to integrated circuit 11. The impedances can be measured for particular ambient temperatures and a table can be used to indicate the reference impedance values for each temperature.

Integrated circuit 11 includes an analog control circuit (not shown) to issue a current to conductive material 22 and an analog switch (e.g., de-multiplexer) (not shown) to control which conductive contact 24 issues the current. Integrated circuit 11 uses an analog switch (e.g., multiplexer) (not shown) to control which conductive contact 24 transfers received current for measurement by integrated circuit 11.

When assembly 10 is available for use by customers, integrated circuit 11 compares the measured impedance value against a reference impedance value stored in memory. In one example, every few microseconds integrated circuit 11 issues a current (direct or alternating) through one or more conductive contacts 24 and receives the current through one or more conductive contacts 24. When the measured impedance value differs from the reference impedance value by a significant percentage, an indication of potential tampering is provided. One or more components of impedance (such as resistance, inductance, or capacitance) can be measured and compared with a reference resistance, inductance or capacitance.

The temperature of conductive material 22 affects the impedance value of conductive material 22. Integrated circuit 11 may include a temperature sensor (not depicted) to measure the temperature of integrated circuit 11. Mechanical proximity of conductive material 22 to integrated circuit 11 means that temperature measured by the temperature sensor can be used as the approximate temperature of the conductive material 22. Integrated circuit 11 can adjust a reference impedance value of the conductive material based on the approximate temperature. In turn, smaller changes in impedance can be associated with tampering. Were temperature of the conductive material 22 not taken into account, larger changes in the impedance of conductive material 22 would be used to trigger an indication of tampering and accordingly some tampering may not be detected.

In one example, the indication of tampering causes a memory that stores sensitive information (such as encryption keys or customer information) to be erased. In one example, the indication of tampering is provided by storing the indication in memory of the integrated circuit. Other indications can include communicating to a server computer that tampering has occurred such that the device that uses the assembly 10 (such as a point of sale device) is disabled.

Figure 2A:
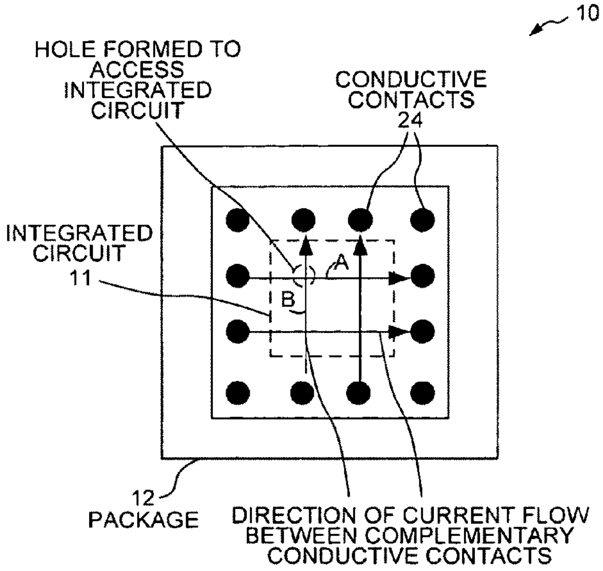
FIG. 2A is a simplified top-down view of the assembly of FIG. 1.

FIG. 2A is a simplified, cross-sectional, top-down view of assembly 10 of FIG. 1. This view shows an arrangement of conductive contacts around the perimeter of the conductive material 22. Conductive contacts 24 would not be visible from the top-down view because conductive contacts 24 are covered by conductive material 22. In one example, an intruder attempts to access the integrated circuit by forming a hole in conductive material 22. The hole changes impedance properties of conductive material 22. Currents are transferred between various ones of conductive contacts 24 and impedances are measured. For example, the impedances through routes A and B are measured. A change in one of these impedances is detected and intrusion is indicated.

Figure 2B:
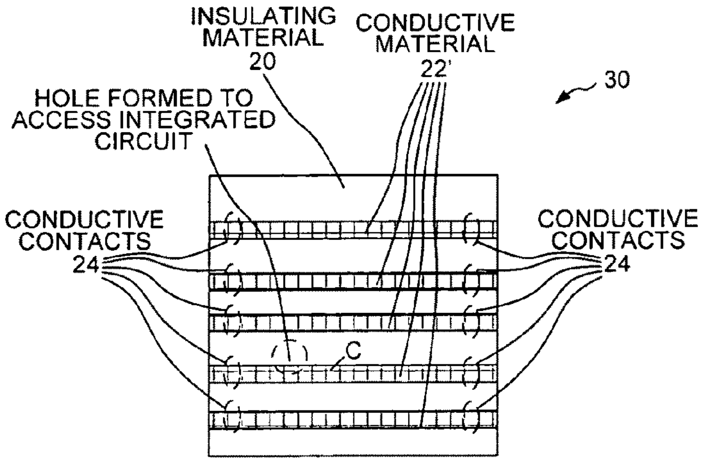
FIG. 2B is a simplified top-down view of an assembly with conductive material provided in strips, in accordance with an embodiment of the present invention.

FIG. 2B is a simplified, cross-sectional, top-down view of an assembly 30, in accordance with an embodiment of the present invention. Assembly 30 is similar to assembly 10, except that rather than forming a continuous region of conductive material 22, conductive material 22' is formed in strips over and/or embedded in insulating material 20. In this embodiment, conductive contacts 24 contact opposite ends of each strip of conductive material 22'. Measurement of signals transmitted through strip C can be used to detect a hole cut by an intruder. The spacing between adjacent strips of conductive material 22' is made small enough so that physical intrusion using standard probing equipment can be detected.

Figure 3:
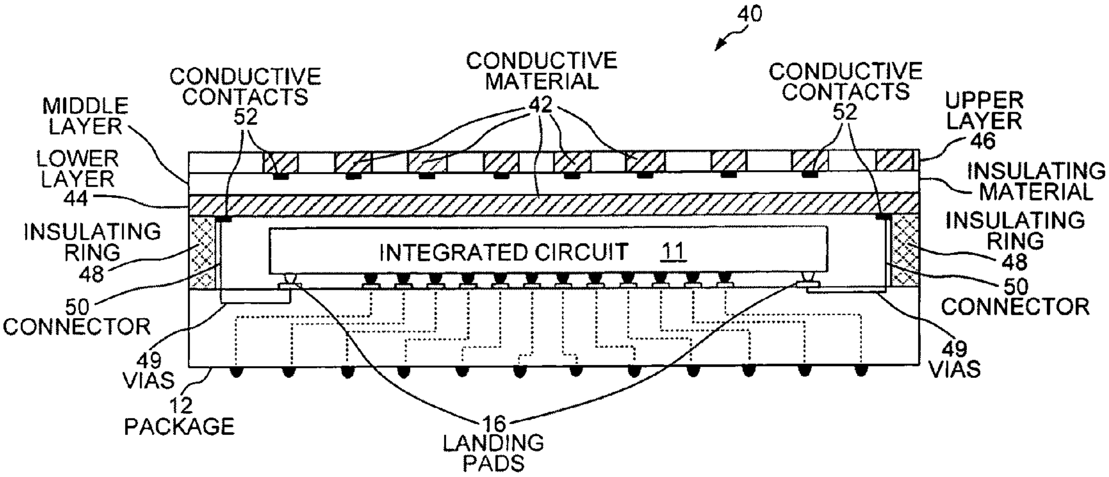
FIG. 3 is a simplified cross-sectional diagram of an assembly with conductive material provided in criss crossing strips for use to detect access to the integrated circuit, in accordance with an embodiment of the present invention.

FIG. 3 is a simplified cross-sectional side view of an assembly 40 with a conductive material provided in criss-crossing strips for use to detect access to the integrated circuit. In this embodiment, insulating ring 48 is formed around integrated circuit 11. In this example, insulating ring 48 does not contact integrated circuit 11. Connectors 50 are formed inside insulating ring 48 and are positioned within insulating ring 48 for alignment with vias 49 inside package 12. In one example, ring 48 is made of a ceramic material. Accordingly, connectors 50 are conductively coupled with vias 49 to transfer signals between vias 49 and conductive contacts 52. Integrated circuit 11 issues signals for transmission through microbumps to a landing pad 16, through a via 49 to connector 50, and ultimately to conductive contact 52. A lower layer 44 includes rows of strips of conductive material 42 formed among insulating material. An upper layer 46 is similar to lower layer 44, except the direction of strips is perpendicular to strips of lower layer 44. A middle layer of insulating layer separates lower layer 44 from upper layer 46. Although not depicted, some of connectors 50 extend through the middle layer to conductively couple vias 49 to conductive contacts 52 of upper layer 46. Conductive material 42 can be the same as that used for the assembly 10.

Figure 4:
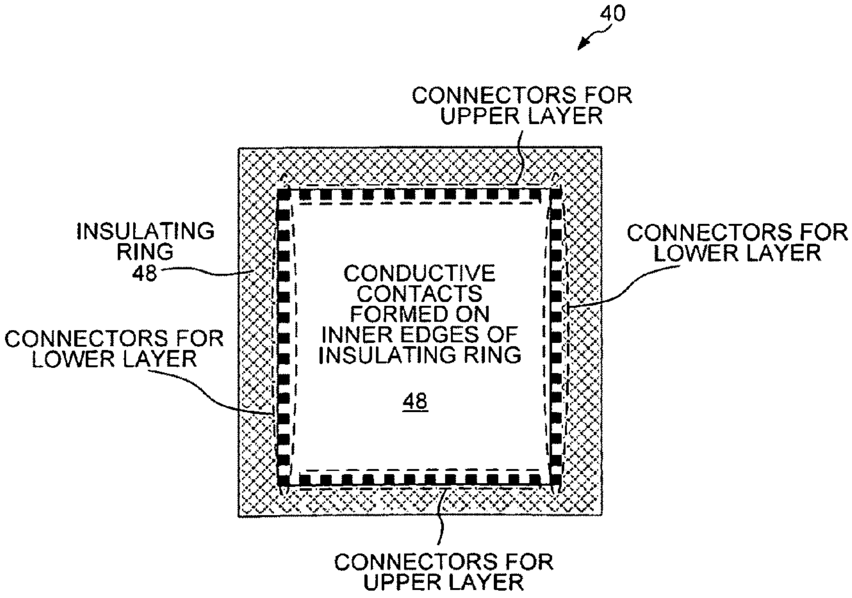
FIG. 4 is a simplified top-down view of the assembly of FIG. 3.

FIG. 4 is a simplified top-down view of the assembly of FIG. 3, in accordance with an embodiment of the present invention. FIG. 4 shows that connectors for upper layer 46 are formed along opposite inner edges of ring 48 whereas connectors for lower layer 44 are formed on other opposite inner edges of ring 48. The connectors for upper layer 46 extend longer than those for lower layer 44 to protrude through middle layer of insulating material to upper layer 46. Conductive contacts 52 for strips of conductive material are positioned to be in contact with connectors 50.

Figure 5:
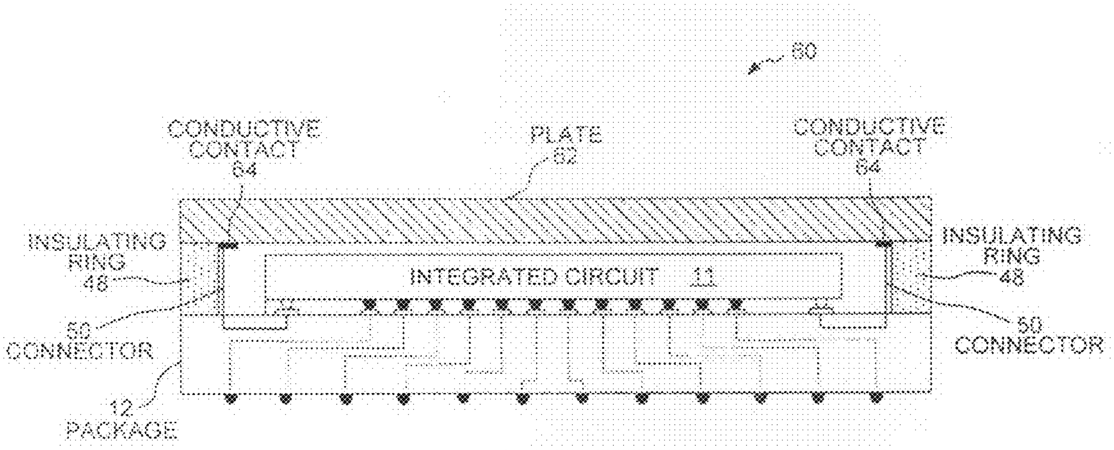
FIG. 5 depicts a simplified cross-sectional diagram of an assembly including an integrated circuit with a conductive plate provided for use to detect access to the integrated circuit.

FIG. 5 depicts a simplified cross-sectional diagram of an assembly 60, including an integrated circuit 11 with a conductive plate 62. Conductive plate 62 enables the detection of access to integrated circuit 11 when conductive plate 62 is cut. As for assembly 40, insulating ring 48 includes connectors 50 formed on the inside edges of insulating ring 48. In one example, plate 62 is a metal plate, and conductive contacts 64 are formed to contact plate 62 around the periphery of plate 62, where the periphery extends at least beyond edges of integrated circuit 11. Conductive contacts 64 align with connectors 50 to form a conductive coupling. In another example, plate 62 is a ceramic material with fine metal strips embedded so that each strip has a conductive contact 64 at each end. Instead of metal strips, conductive material as described with respect to assembly 10 can be used.

Figure 6:
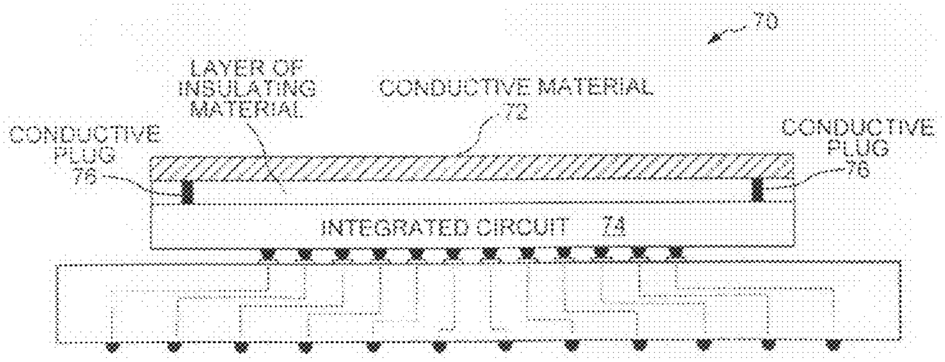
FIG. 6 depicts a simplified cross-sectional diagram of an assembly including an integrated circuit with a conductive material provided to detect access to the integrated circuit.

FIG. 6 depicts a simplified cross-sectional diagram of an assembly 70, including an integrated circuit 74 with a conductive material 72 provided to detect access to integrated circuit 74. In this embodiment, conductive plugs 76 protrude from the top of integrated circuit 74 and through a layer of insulating material to contact conductive material 72. The layer of insulating material separates integrated circuit 74 from conductive material 72. The layer of insulating material can be an oxide layer formed over the top of integrated circuit 74. In one example, conductive plugs 76 are formed around the periphery of conductive material 72. Conductive material for conductive material 72 can be the same as that described with respect to assembly 10 or any other embodiment. In another example, conductive material 72 is strips of conductive material as described with regard to FIG. 2B, and conductive plugs 74 contact ends of the strips. Integrated circuit 74 measures changes in properties of conductive material 72 by providing a signal through one or more conductive plug 76 and measuring the signal received at one or more other conductive plugs 76. For example, an impedance can be measured and compared to a reference impedance value to detect tampering with conductive material 72.

Figure 7:
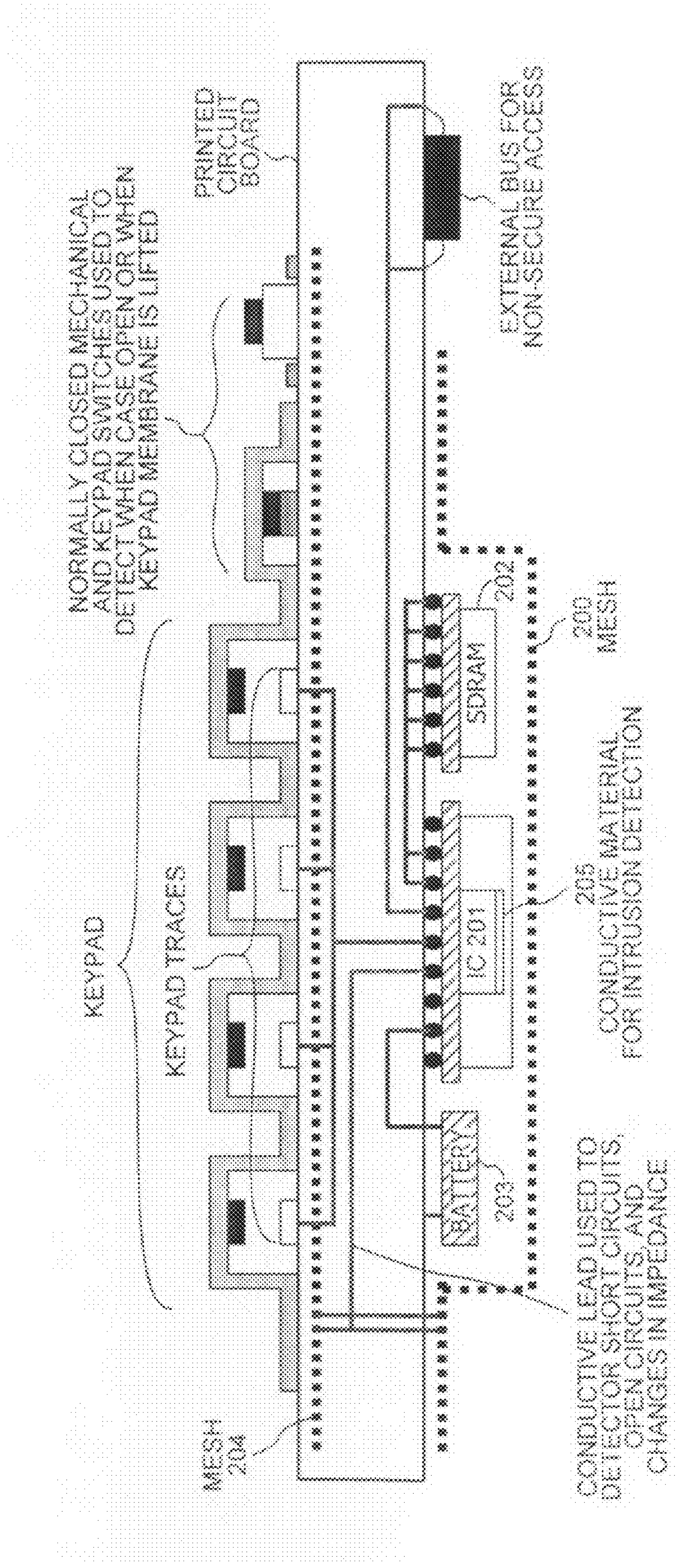
FIG. 7 is a simplified cross-sectional view of point of sale device.

FIG. 7 is a simplified cross-sectional view of point of sale device. For example, the device of FIG. 7 can be used in an automated teller machine or a credit card reading device. FIG. 7 shows that a mesh 200 is used to cover the top side of integrated circuit (IC) 201, memory 202, and battery 203. Another mesh 204 is used to cover the underside of the integrated circuit 201, memory 202, and battery 203. Integrated circuit 201 detects tampering with either mesh. Each mesh includes many pairs of very fine wires or conductors. The wires of each such pair extend in a serpentine fashion in parallel. If any of the wires is broken, then this condition is detected by the integrated circuit. Also, if any part of the first of the wires touches any part of the second of the wires, then this condition is detected by the integrated circuit. Accordingly, if a thief were to attempt to probe any device by pushing a probe through the mesh, then the probing would likely cause a first wire to touch a second wire, and this tamper condition would be detected. If the thief were to attempt to drill a hole in the mesh to obtain access for a probe, this tamper condition would also be detected.

In this embodiment, integrated circuit 201 includes a conductive material 205 formed over its surface to detect access to the integrated circuit. Application of conductive material 205 can be accomplished using any of the embodiments described herein. Detection of tampering can occur using any of the embodiments described herein. Accordingly, use of mesh and conductive material provides redundant tampering capabilities.

The point of sale device of FIG. 7 can be used in connection with a financial transaction. Consider an example of a transaction with a debit card. A customer presents the debit card to the cashier of a store. The cashier swipes the magnetic stripe on the card through a magnetic card reader on the point of sale terminal. The magnetic card reader reads an account number encoded in the magnetic stripe of the card. The customer then, for identification purposes, typically enters a personal identification number (PIN) into a keypad device coupled to the point of sale terminal. The customer may also enter other identification information. The point of sale terminal then uses an encryption key stored in the point of sale terminal to encrypt the account number (from the swiped debit card), the identification number (for example, the PIN number), and other information about the transaction such as the amount of the transaction and the date of the transaction. The encrypted information is sent from the point of sale terminal to the financial institution via a modem or other electronic communication link. The financial institution receives the encrypted information and uses an encryption key to decrypt the information and recover the account number, identification information, and information about the transaction. In the case where the transaction is a debit transaction, the bank account of the customer is debited. A confirmation of the transaction is then encrypted using the encryption key and the encrypted confirmation is communicated from the financial institution back to the point of sale terminal. The point of sale terminal uses the encryption key stored in the point of sale terminal to decrypt the confirmation.

Thieves attempt to access sensitive information of customers, such as previously stored account numbers and personal identification numbers, and sensitive information of the point of sale device, such as encryption keys. The techniques described herein may prevent access to this sensitive information. For example, sensitive information may be stored in SDRAM 202. In response to detecting intrusion, the SDRAM is erased.

Figure 8:
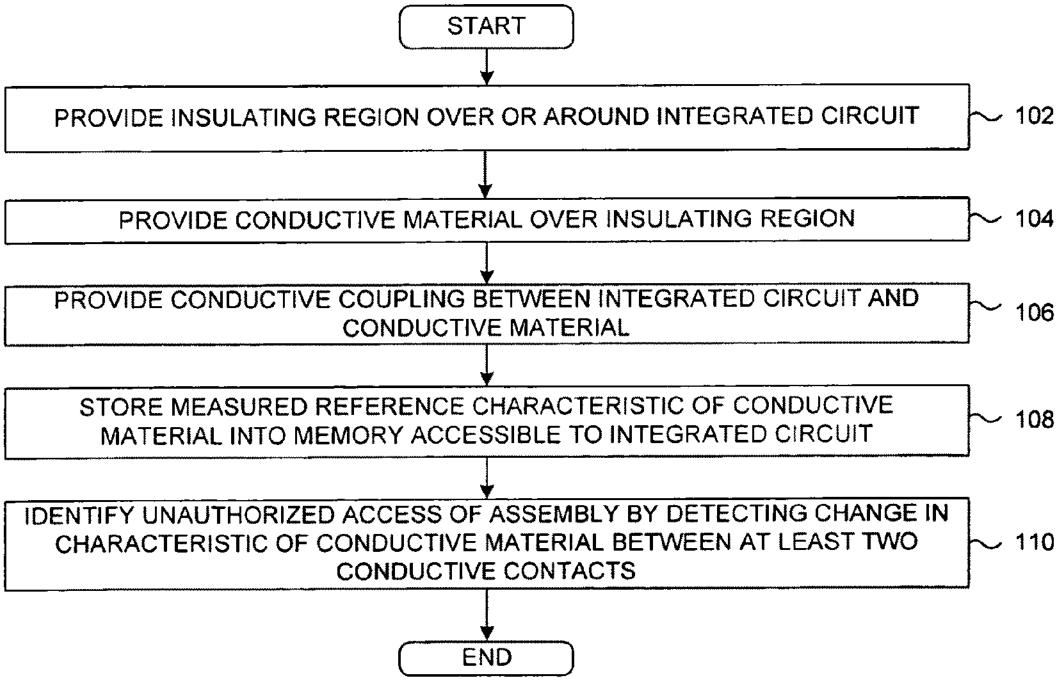
FIG. 8 is a flowchart of a method that can be used to detect access to an integrated circuit in accordance with an embodiment of the present invention.

FIG. 8 is a flowchart of a method that can be used to detect access to an integrated circuit in accordance with an embodiment of the present invention. In action 102, an insulating region is formed over or around an integrated circuit. The insulating region can be provided using a molding technique. The insulating region can be that described in any of or a combination of any embodiment described with regard to figures herein. In action 104, a conductive material is provided over the insulating region. The conductive material can be provided using a mold. The conductive material can be that described in any of or a combination of any embodiment described with regard to figures herein. For example, the conductive material can be a mixture of resin and conductive fibers or powders. In action 106, conductive coupling is provided between the integrated circuit and conductive material. For example, conductive coupling can take the form of connectors, conductive contacts, and/or plugs formed in or in contact with the insulating region and the conductive material as described with any embodiment. In action 108, characteristics of the conductive material are measured and stored as values into a memory. The memory is accessible to the integrated circuit. For example, impedance (e.g., resistance, inductance, and/or capacitance) measured for a direct current or alternating current applied through at least one conductive contact is stored in the memory. In action 110, access is monitored by detecting a change in a characteristic of the conductive material measured between two or more conductive contacts. In one example, the integrated circuit causes current to flow between two or more conductive contacts by way of the conductive couplings. An impedance (e.g., resistance, inductance, and/or capacitance) is then measured for current received at one or more conductive couplings. The measured impedance is compared with the stored expected impedance associated with the relevant one or more conductive couplings. In one example, temperature of the integrated circuit is taken into account to determine the expected impedance measured by way of one or more conductive coupling. If the measured impedance is significantly different from the expected impedance, then the assembly is considered to have been tampered with and the memory that stores sensitive information is erased.

Although some embodiments of the present invention have been described in connection with certain specific embodiments for instructional purposes, the present invention is not limited thereto. In another example of assembly 10 of FIG. 1, the insulating material is an oxide layer formed over integrated circuit 11 during fabrication of integrated circuit 11. In one example, the impedance through conductive material can be non-uniform. In another embodiment of FIG. 1, the circuitry is fabricated on the side of integrated circuit 11 facing away from inside upper surface 13 and microbumps of integrated circuit 11 face away from inside upper surface 13 such that conductive leads conductively couple the microbumps to conductors on package 12 by extending from the periphery of integrated circuit 11. In one example, conductive material 22 can be formed from fibers or textiles that are then woven or webbed into a conductive fabric. In one example, the memory that stores the reference impedance values is different from the memory that stores sensitive information. The memories may be different storage arrays or even memory types, i.e., flip-flops as opposed to SRAM. In one example, the conductive loaded resin-based material is formed in strips and interwoven. In one example, rather than forming strips of conductive material 22', a spiral and/or serpentine pattern is provided. In one example of the embodiment of FIG. 6, the integrated circuit 74 has its active circuit side facing toward the conductive material and conductive leads from integrated circuit 74 are coupled to conductive receivers outside of the periphery of the integrated circuit 74. In FIG. 7, instead of using mesh, the resin-based conductive material can be used.

In one example, in addition or as an alternative to measuring an impedance, a natural resonating frequency of the conductive material can be measured to determine an expected resonating frequency. Subsequently, the natural resonating frequency of the conductive material can be measured again and compared with the expected natural resonating frequency of the conductive material. If the measured and expected frequencies differ, then a determination is made that tampering with the assembly has occurred. A voltage or current can be propagated through the conductive material to determine the natural resonating frequency.

Accordingly, various modifications, adaptations, and combinations of various features of the described embodiments can be practiced without departing from the scope of the invention as set forth in the claims.

What is claimed is:

1. An apparatus comprising:

an integrated circuit device;

a memory coupled to the integrated circuit device, the memory stores at least one reference value; and a molded conductive material formed over the integrated circuit device, wherein the molded conductive material comprises a resin-based conductor, and wherein an indication of an access to the integrated circuit device is based in part on a measurement of a change of at least one property of the molded conductive material against the reference value stored in the memory.

2. The apparatus of claim 1, further comprising:

an electrically insulating region, wherein the electrically insulating region separates the molded conductive -material from the integrated circuit device.

3. The apparatus of claim 1, wherein the at least one property comprises an impedance of a portion of the molded conductive material.

4. The apparatus of claim 1, wherein the molded conductive material includes a conductive powder interspersed within a resin.

5. The apparatus of claim 4, wherein the conductive powder is selected from a group consisting of: carbon, graphite, metal plated carbon, metal plated graphite, stainless steel, nickel, copper and silver.

6. The apparatus of claim 1, wherein the molded conductive material includes a conductive powder and conductive fibers interspersed within a resin.

7. The apparatus of claim 6, wherein the conductive fibers are selected from a group consisting of: nickel plated carbon fiber, stainless steel fiber, copper fiber, silver fiber and carbon nanotubes.

8. The apparatus of claim 1, further comprising:

an input contact and an output contact, wherein an electrically conductive path through the molded conductive material couples the input contact with the output contact.

9. An apparatus comprising:

an integrated circuit;

a memory coupled to the integrated circuit device, the memory stores at least one reference value; and means for indicating a tampering with the integrated circuit, wherein the means comprises an homogenized conductive material molded over the integrated circuit, wherein the means indicates the tampering by detecting a change in a property of a portion of the homogenized conductive material against the reference value stored in the memory, and wherein the homogenized conductive material comprises a conductive thermoplastic.

10. The apparatus of claim 9, wherein the property of the portion of the homogenized conductive material is an impedance of the portion.

11. The apparatus of claim 9, wherein the homogenized conductive material is molded over the integrated circuit in at least one strip.

12. The apparatus of claim 9, wherein the homogenized conductive material includes a second material interspersed within a resin, and wherein the second material is selected from a group consisting of: a conductive powder and conductive fibers.

13. The apparatus of claim 12, wherein a constituent of the conductive powder is selected from a group consisting of: carbon, graphite, metal plated carbon, metal plated graphite, stainless steel, nickel, copper and silver.

14. The apparatus of claim 12, wherein the conductive fibers are selected from a group consisting of: nickel plated carbon fibers, stainless steel fibers, copper fibers, silver fibers and carbon nanotubes.

15. A method comprising:

indicating an access to an integrated circuit device based in part on a change of at least one property of a molded homogenized conductive material that is disposed over the integrated circuit device;

wherein the change of the property of the molded homogenized conductive material is measured against a reference value stored in a memory.

16. The method of claim 15, wherein the molded homogenized conductive material comprises a conductive powder homogenized within a resin.

17. The method of claim 15, wherein the molded homogenized conductive material is a resin that contains a conductive powder, and wherein the molded homogenized conductive material is disposed over the integrated circuit device in at least one strip.

18. The method of claim 15, further comprising:

erasing a memory that stores confidential information in response to the indicating of the access.

19. The method of claim 15, wherein the molded homogenized conductive material comprises conductive fibers homogenized within a resin.

20. The method of claim 15, wherein the property is taken from a group consisting of: an impedance through a portion of the molded homogenized conductive material, a current through the portion, a resistance of the portion, an inductance of the portion and a capacitance of the portion.

* * * * *